March 3, 1970  E. A. HARRAWOOD  3,498,666
ROLLUP LOAD COVER APPARATUS FOR DUMP BODIES
Filed May 14, 1968

Inventor
EDWARD A. HARRAWOOD

By Jerome A. Gross,
Attorney

United States Patent Office 3,498,666
Patented Mar. 3, 1970

3,498,666
ROLLUP LOAD COVER APPARATUS
FOR DUMP BODIES
Edward A. Harrawood, Ballwin, Mo., assignor to Ford
Lane Equipment Company, Hazelwood, Mo., a corporation of Missouri
Filed May 14, 1968, Ser. No. 729,039
Int. Cl. B60p 7/04
U.S. Cl. 296—100                              3 Claims

ABSTRACT OF THE DISCLOSURE

A load cover for dump trucks has a forward-mounted crank-operated roller rod held in an open-back box frame. To the rod is secured one end of a roll-up load cover; to its other end is secured the lateral mid-portion of a swinging U-shaped frame, whose side arms are mounted on a pivot near the mid-point of the body bed. As the cover is unrolled from the rod, tension springs lift the swinging frame upward and aft overcenter. As the cover is rolled onto the rod, the same springs assure smooth rolling by restraining the frame from dropping forwardly.

BACKGROUND OF THE INVENTION

This invention relates to load covers for dump trucks such as are used for carrying sand, gravel and other materials for construction and other purposes. When a load of such materials is placed in a dump body, the center of the load often extends to a height greater than that of the sides of the dump body. It is desirable that such a load be covered when the vehicle is in operation, and recently enacted highway regulations may require covering such loads.

Heretofore there was no convenient way that the operator of the vehicle could quickly cover and uncover the load, without assistance.

SUMMARY OF THE INVENTION

The purposes of the present invention include providing a load cover which is readily utilized to cover the load, and may be removed therefrom by one person, without assistance. Another purpose is to draw such a cover securely over a load which is higher at its center than the sides of the dump body. Additional purposes are to provide for carrying the cover on a roller; while unrolling the cover to draw it upward over a high load; to hold the cover securely over such load; and on uncovering, first to lift the cover above such load and then to provide a restraining force which will assure its smooth rolling on the roller.

These purposes are achieved in the present invention, a preferred embodiment of which is described hereafter, by providing elements of apparatus which are generally as follows: a roller rod whose length substantially equals the spacing of the side walls of the dump body; means to support the rod forward of the front wall of the dump body, for rotation by cranking in either sense; and a flexible sheet load cover, such as a tarpaulin, one end of which is secured to the roller rod, the other being secured to the mid-portion of a U-shaped swinging frame. The U-shaped frame has arm portions extending from its mid-portion to aligned hinge points at the outer side of the dump body, along a transverse axis lower than the roller rod and at a distance from it which substantially equals the length of the arm portions. Tension spring means extend from the arm portions aft to a rear point of securement on the dump body.

When the swinging frame is rotated arcuately aft to unroll the cover, it is drawn first upward, over material which may be piled high in the dump body, and then downward to and over the rear gate of the dump body. In this position the weight of the swinging frame itself tends to hold the cover over the load. The tension springs provide the force necessary to lift the frame at the beginning of its aft arcuate movement. For uncovering the load, the roller rod is cranked to wind the cover on it, the frame lifts the cover upward over the load; and as it passes forward of the point of pivoting, the tension springs restrain it from falling forward to assure smooth rolling of the cover on the roller rod.

DESCRIPTION OF THE PREFERRED EMBODIMENT

Figure 2:
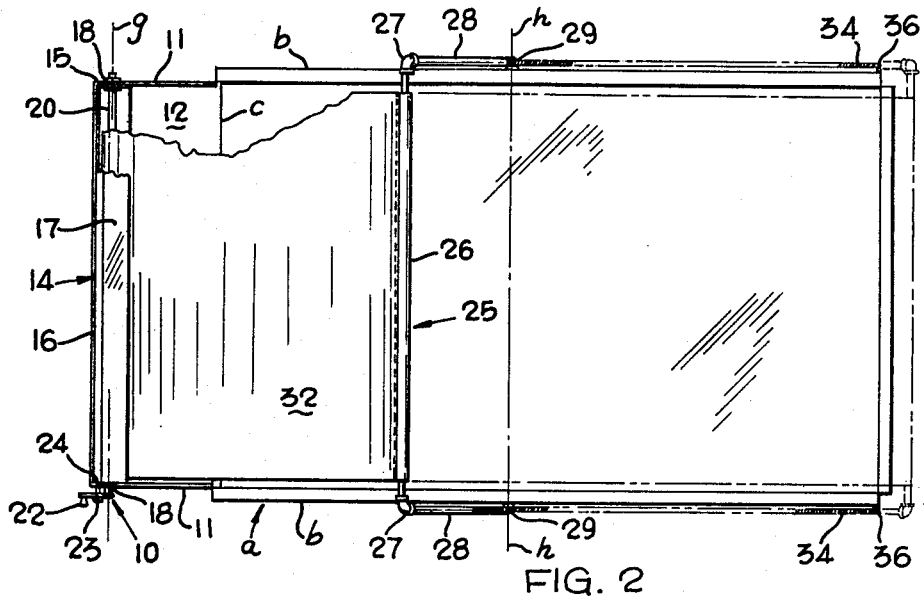
FIG. 2 is a corresponding plan view thereof.
Figure 1:
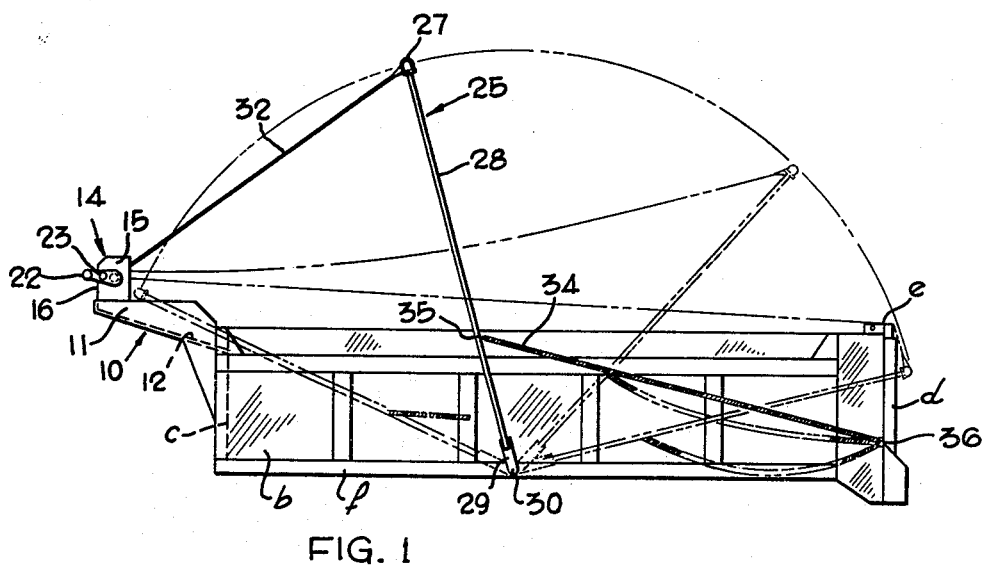
FIG. 1 is an elevational view of the present invention partly covering a dump body, the dashed lines showing various positions from uncovered to fully covered.

In FIG. 1 is shown a conventional dump body, generally designated $a$. It includes a pair of substantially vertical side walls $b$, a forward wall $c$ and a discharge gate $d$ hinged on laterally aligned pivots $e$ at the rear upper edge of the side walls $b$. Connecting the lower edges of the side walls $b$ and front wall $c$ is a conventional dump body bed $f$.

In the present invention means are provided forward of the front wall $c$ to support a roller rod hereinafter described, near its ends, for rotation on a transverse roller axis $g$. Such means are preferably a simple header structure generally designated 10. As best shown in FIG. 1 it comprises a pair of upward and forward extending arms 11 formed of vertical plates welded forwardly of the dump body forward wall $c$, and a forward up sloping header plate 12 which gives lateral stability to the header arms 11. The spacing of the header arms 11 is preferably substantially that of the side walls $b$. Along the forward upper edges of the header arms 11 is welded a box frame generally designated 14, open to the rear. It includes two side walls 15 which are welded upright onto the forward upper edges of the header arms 11, a forward box frame surface 16, and an upper box frame surface 17. Within the side walls 15 are bushings 18 transversely aligned along the axis $g$, to serve as bearing means.

Within the bushings 18 is mounted a roller rod 20 whose length substantially equals the spacing of the side walls, and is greater than the spacing between the adjacent edges of the bushings 18 mounted thereon so as to be supported thereby for rotation in either sense along the axis $g$. Rotation may be effected by any known means, such as a reversible electric motor, not shown, or by a simple crank 22 projecting from one end of the roller rod 20 outward of the side wall 15. A simple latch restrains the roller rod 20 from rotation. In the simplified illustration, a pin 23 through the crank 22 engages a bore 24 in the side wall 15. Such pin 23 is drawn outward to release the crank 22 so that it may be turned manually by the operator in either sense of rotation.

A U-shaped swinging frame generally designated 25 is utilized to apply and remove the load cover from over the body $a$, as hereinafter described. The U-shaped frame 25 has a transverse mid-portion rod 26 which extends laterally across the dump body *a* and is of slightly greater length than the spacing of the sides *b*.

Attached to elbows 27 at its ends are arm tubular rods 28 which serve as arm portions for the U-shaped frame 25. Their length is greater than half the distance from the axis *g* of the roller rod 20 to the discharge gate *d*. At their ends opposite to the elbows 27, the arm portions terminate in pivot end plates 29 bored transversely and pivot mounted on aligned pivot bolts 30, which serve as means to secure them pivotally to the bed *f* of the dump body *a*. The aligned pivot bolts 30 provides a frame pivot axis *h* which, as shown in the drawings, is lower than the roller rod 20 and at a distance therefrom which substantially equals the length of the arm portions 28. Thus, when the frame 25 is lowered forwardly as shown in FIG. 1 the transverse mid-portion 26 of the frame 25 will be closely adjacent to the roller rod 20 and the arms 28 will slope aft and downward to the pivot bolts 30.

A load cover 32 is made of rectangular, flexible sheet material sufficiently rugged for the purpose, such as a conventional tarpaulin. Its length is sufficient to extend from the roller rod 20 to and over the discharge gate *d*, and its width is slightly less than the spacing of the bushings 18 in the side walls 15 of the box frame 14. The forward end of the load cover is secured to the roller rod 20, and its opposite end is secured to the transverse mid-portion 26 of the swinging frame 25.

As shown by the various dashed line positions of FIG. 1, a load substantially higher at center than the side walls *b* may be covered. From the condition in which the cover 32 is completely rolled onto the rod 20 and the swinging frame is in its most forward position, swinging it backward draws it upward, over and down in an arc. Thus, first it raises gradually to the solid line position shown in FIG. 1 wherein the cover is lifted high above the load; and swinging farther backward draws it further aft and downward over the load, to the final position over the discharge gate *d*. To uncover the load, the swinging frame 25 is drawn forward and upward in an arc and thence downward to the position adjacent to the box frame 14. In this position the cover is protected, so that materials may be dumped into the body from above without danger of damage to it.

It is desirable that the swinging frame 25 be rugged and thus fairly heavy; this requirement would make it difficult or impossible for a man operating the crank 22 to also lift the frame 25 at the beginning of its aft movement. It is also desirable that on swinging movement of the frame forwardly of the pivot axis *h*, it should not fall forwardly, because this would interfere with the smooth winding of the cover 32.

To serve these purposes, tension spring means are provided. In the embodiment illustrated such means consists of elongated coil springs 34; these extend aft from points on the arm portions 28 of the swinging frame 25 outwardly of the pivot ends 29, where the forward ends of the springs 34 pass through drilled bores 35 in each arm 28. From the point of securement 35 on the arm portions 28 each tension spring 34 extends aft to a rear point of securement 36, preferably a simple pin in each side wall *b* immediately forward of the gate *d*.

On rotation of the roller rod 20 to unwind the cover 32 from it, the tension springs draw the frame swingingly upward and aft from the most forward position shown in dashed lines in FIG. 1, over the transverse pivot axis *h*. When drawn back aft to this point, the springs 34 may be completely contracted to their unstressed length, for no further tension force is needed. Aft of this point, the springs 34 may droop slightly, as when the swinging frame 25 is in its rearmost position shown in FIG. 1, with the load cover 32 drawn across and over the discharge gate *d*. Only in the forward portion of the arc of movement is it necessary that an aft force be supplied to the swinging frame 25; for in the rear portion of the arc, the weight of the swinging frame 25 will draw it downward to apply the load cover 32 over the dump body discharge gate *d*.

While its weight may be sufficient for this purpose, the swinging frame may be tied in the aft position, by conventional means not shown.

For uncovering the load, such tie-down means would first be released. On cranking the roller rod 20 to rotate it to wind the load cover 32 thereon, the crank force raises the swinging frame 25 gradually against its own weight, to a point where it is above the pivot axis *h*. Forwardly of this point, on continued cranking the tension force developed in the springs 34 will resist downward and forward swinging of the frame 25. Thus it cannot move forward and downward by its own weight; and the tension assures smooth rolling of the load cover 32 on the roller rod 20.

It will be obvious that minor modifications may be made; thus in specific applications it may be desired to locate the pivot bolts 30 by which the pivot axis *h* is established at a somewhat different height, or to vary the length of the arm portion 28 of the hinged frame 25 to achieve precise positioning either in the forward position at the box frame 14 or the aft position at the discharge gate *d*, or both. Further, it will be obvious to use a reversible electric motor to rotate the roller rod 20, rather than the crank shown; and such motor will permit the load to be covered and uncovered without the operator leaving the cab of the truck.

Other variations will occur to those familiar with operating dump bodies. Therefore, the present invention is not to be construed narrowly, but rather as co-extensive with the claims.

I claim:

1. For use with a body having front and side walls and a rear wall:
   roll-up load cover apparatus comprising
   a roller rod whose length substantially equals the spacing of the side walls,
   means forward of such front wall to support said roller rod, near its ends, for rotation on a transverse roller axis,
   means to rotate said roller rod in opposite senses,
   a flexible sheet load cover having an end secured to said roller rod, the length of the cover being sufficient to extend from said rod to such rear wall,
   a U-shaped swinging frame having
   a transverse mid-portion to which the opposite end of the cover is secured, and having
   arm portions extending from the ends of the mid-portion, the arm portions being of a length greater than half the distance from the roller rod to such rear wall and terminating in pivot ends, and
   means to secure said ends pivotally to the body along a transverse pivot axis lower than the roller rod and at a distance therefrom substantially equalling the length of said arm portions,
   whereby on rotation of the roller to unwind the cover therefrom, the cover is drawn aft in an arc first upward and then downward, together with
   tension spring means, extending from a point on an arm portion of said swinging frame outwardly of its pivot end, aft to a rear point of securement on such body,
   said spring means having an unstressed length no greater than the distance from said rear point of securement to the said point on the arm portion of the swinging frame when said frame is swung upward directly over the pivot axis, said unstressed length being such that the spring means draws the frame only to a point above and over the pivot axis and the weight of said frame draws it thence downwardly over such rear wall.

2. A roll-up load cover apparatus as defined in claim 1, wherein the means to support the roller rod comprises:
   a header extending forwardly and above the body front wall, and
   a box frame having side walls including transversely aligned bearing means, the box frame being open to the rear and otherwise closed, whereby to protect the load cover forwardly of the forward wall of the body.

3. A roll-up load cover apparatus as defined in claim 1, wherein:

the means to rotate the roller rod in opposite senses is a crank projecting from one end of said roller rod outward of said means whereby to support it, together with latch means operable to restrain the roller rod from rotation.

References Cited

UNITED STATES PATENTS

| 1,441,495 | 4/1911 | Galvin | 160—68 |
| 1,798,836 | 3/1931 | Helms | 296—100 |
| 3,146,824 | 9/1964 | Veillevx | 160—23 |
| 3,168,345 | 2/1965 | Roberts et al. | 296—100 |

LEO FRIAGLIA, Primary Examiner

R. R. SONG, Assistant Examiner

U.S. Cl. X.R.

296—98